United States Patent [19]
Chiodo

[11] Patent Number: 5,252,204
[45] Date of Patent: Oct. 12, 1993

[54] UNIMOLD FILTER

[75] Inventor: Daniel J. Chiodo, Hialeah, Fla.

[73] Assignee: Manufacturers Components, Inc., Hialeah, Fla.

[21] Appl. No.: 932,985

[22] Filed: Aug. 20, 1992

[51] Int. Cl.⁵ ............................................. B01D 39/10
[52] U.S. Cl. ........................... 210/232; 210/497.01; 210/497.3; 210/499
[58] Field of Search ............... 210/232, 474, 477, 482, 210/447.1, 489, 497.2, 499, 497.3, 497.01

[56] References Cited

U.S. PATENT DOCUMENTS

| | | |
|---|---|---|
| 752,019 | 2/1904 | Adwen . |
| 3,592,126 | 7/1991 | Dombrowilk ................. 210/474 |
| 4,271,024 | 6/1981 | Kawolics et al. .............. 210/474 |
| 4,374,026 | 2/1983 | Greutert ........................ 210/493 |
| 4,382,861 | 5/1983 | Adeboi et al. ................. 210/497.2 |
| 4,497,709 | 2/1985 | Nicholson ..................... 210/489 |
| 4,832,845 | 5/1989 | Hendretti ...................... 210/470 |
| 4,882,055 | 11/1989 | Stamstad ..................... 210/483 |
| 4,940,189 | 7/1990 | Cremonese .................. 229/1.5 B |

Primary Examiner—Robert A. Dawson
Assistant Examiner—David Reifsnyder
Attorney, Agent, or Firm—Oltman and Flynn

[57] ABSTRACT

A filter for separating a fluid and particles immixed in the fluid, comprising a screen formed of a plurality of mutually attached screen panels, each screen panel defined by respective panel edges, and a molded filter frame including a plurality of molded frame members, wherein the panel edges are molded into the molded frame members.

10 Claims, 3 Drawing Sheets

UNIMOLD FILTER

The invention relates to a filter for straining liquids containing particles to be separated from the liquid and in particular to a filter composed of a filter screen and a filter frame molded as a single unitary component with the edges of the filter screen molded into the molded filter frame.

BACKGROUND OF THE INVENTION

Filters for straining liquids containing finely dispersed particles therein are commonly formed as a perforated filter basket with a disposable filter element for example made of filter paper inserted into the filter basket. Filters with disposable filter inserts are inconvenient in use, due to the need for always having disposable paper filters available.

The prior art shows filters wherein a screen and a filter frame are combined in various ways. U.S. Pat. No. 4,374,026 shows for example a basket filter with various filter or screen elements having their adjoining edges embedded in plastic. This filter, however, has the drawback that it is composed of several screen parts that must first be assembled and then embedded in plastic. U.S. Pat. No. 4,882,055 shows a unitary injection molded filter wherein the filter screen and the supporting frame are molded as an integral part. This filter, however, has the drawback that a high degree of fineness of the filter is virtually impossible to attain, since every single hole in the filter screen must be molded into the screen during the molding process.

The filter according to U.S. Pat. No. 4,882,055 therefore is unsuitable for filter applications wherein it is necessary to provide a high degree of fineness of the filter screen.

It is accordingly an object of the instant invention to provide a unitary filter assembly that overcomes the drawbacks of the known filters, is inexpensive to manufacture and can be provided with a high degree of fineness of the filter screen.

Further objects and advantages of this invention wail be apparent from the following detailed description of a presently preferred embodiment which is illustrated schematically in the accompanying drawings.

SUMMARY OF THE INVENTION

In accordance with the invention there is provided a filter for separating a fluid and particles immixed in the fluid, comprising a screen formed of a plurality of mutually attached screen panels, each screen panel defined by respective panel edges, and a molded filter frame including a plurality of molded frame members, wherein the panel edges are molded into the molded frame members.

The filter according to the invention may include in the plurality of screen panels a bottom screen panel having a bottom periphery, each of the side panels having a bottom edge having an edge section being contiguous with the bottom panel along a part of the bottom periphery, and wherein the bottom screen panel has a center opening and a plurality of radial slots in the bottom screen panel, each radial slot radially extending from a point proximal to the center opening to a point proximal to the bottom periphery, and wherein the radial slots have edges molded into respective ones of the molded frame members.

The filter may further include in the molded frame members an upper circular frame member, a lower circular frame member spaced downward from the upper circular frame member, wherein the upper circular frame member has a diameter greater than the diameter of the lower frame member, and a plurality of molded space members in the plurality of molded frame members, wherein the space members are connected between the upper and lower circular frame member.

In the filter the lower circular frame member has a center, and a plurality of radial members in the plurality of molded frame members extending from the center to the lower circular frame member, and a center button disposed in the center, the center button joining the radial members at their inner ends.

According to a particular feature the screen is formed as a woven mesh of wires, wherein the woven mesh of wires comprises wires of stainless steel.

According to snottier feature the molded filter frame is molded as a unitary unit formed of the molded frame members.

A method for making a filter for separating a fluid and particles immixed in the fluid, comprising the steps of:
(a) cutting a filter screen from a piece of filter material, the screen composed of a plurality of adjoining mutually attached screen panels, each panel defined by a respective set of panel edges;
(b) forming the screen into a filter basket having a bottom screen panel, and wherein the adjoining filter screen panels have mutually adjoining panel edges:
(c) forming in a mold a filter frame composed of a plurality of molded frame members, wherein the adjoining panel edges are molded into the molded frame members, and further wherein the mold is an injection mold, the method further comprising the step of forming in the injection mold respective cavities for forming the molded frame members, and wherein each of the cavities overlap adjoining panel edges.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

DESCRIPTION OF THE PREFERRED EMBODIMENTS

Figure 1:
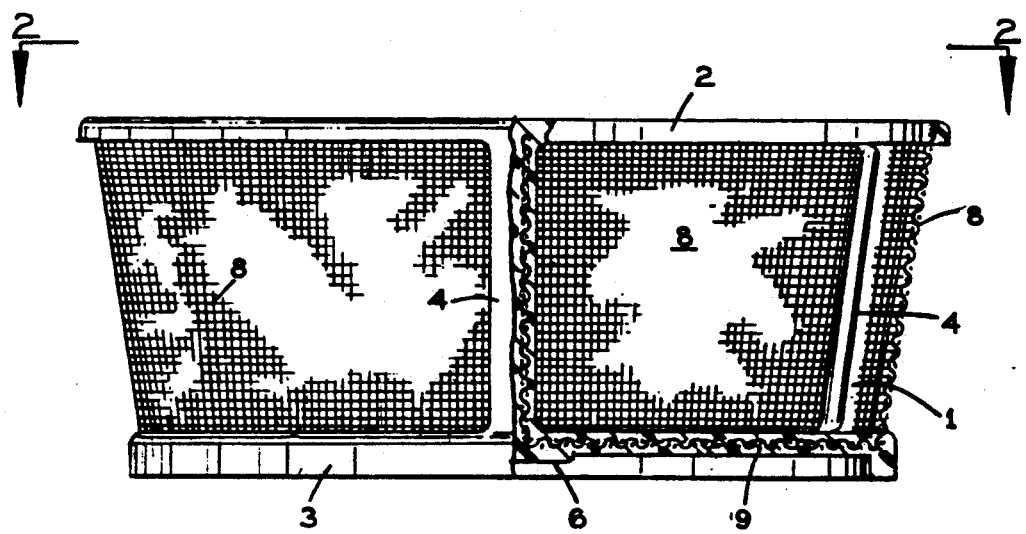
FIG. 1 is an elevational part cross-sectional view of the invention seen along the line 1—1 of FIG. 2.

FIG. 1 shows the filter according to the invention constructed essentially as a basket formed of molded frame members with an upper circular frame member 2, a circular lower frame member 3, and a plurality of molded space members 4 connecting the upper and lower circular frame members 2 and 3. FIG. 1 shows part of the filter broken away as indicated by the line 1—1 of FIG. 2 to show the cross-section of the upper and lower circular frame members.

Figure 2:
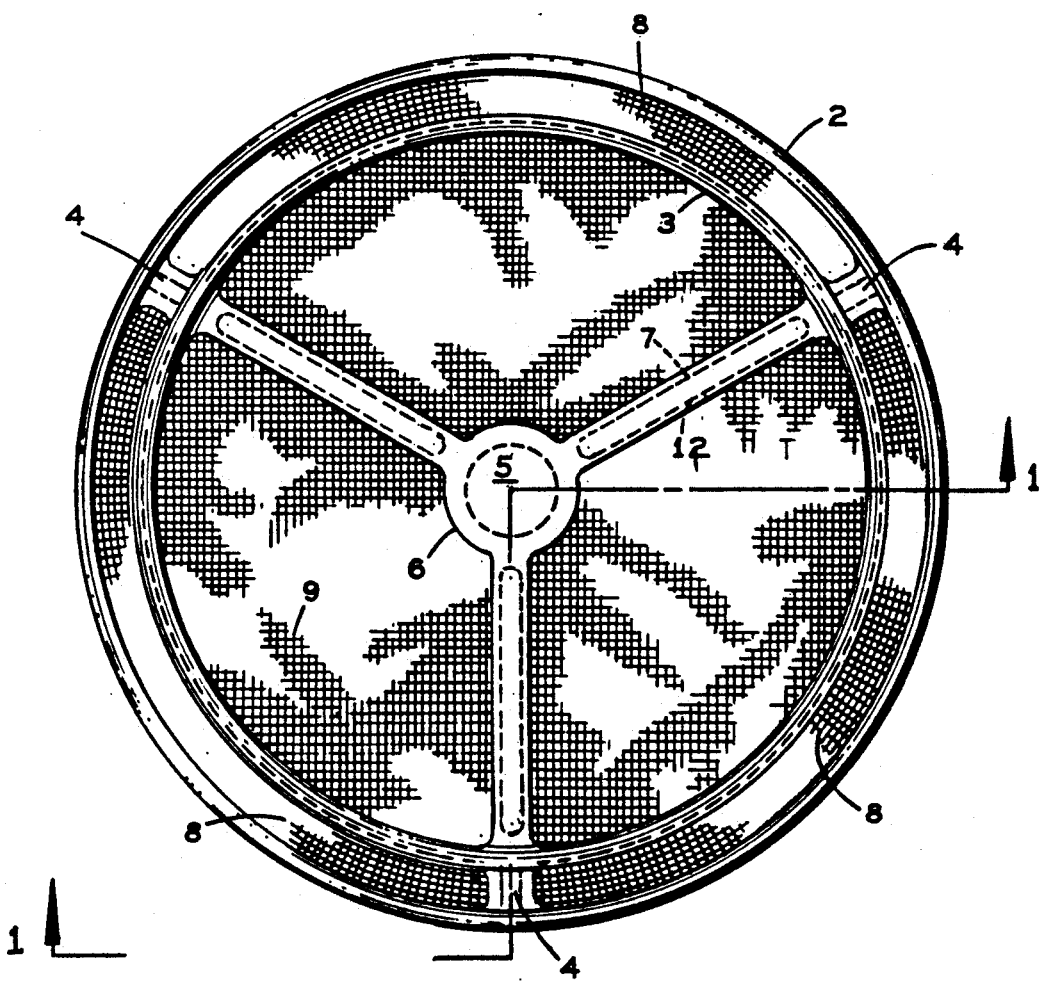
FIG. 2 is a plan view of the invention seen along the line 2—2 of FIG. 1.

FIG. 2 is a top-down plan view of the filter showing the bottom of the filter which includes a center button 6 that connects three radial bottom molded frame members 7 with the lower circular frame member 3.

The upper circular frame member 2 may advantageously be somewhat larger in diameter than the lower circular frame member 3 giving the entire filter frame the shape of an inverted frustocone.

The molded frame members form between them windows that are filled with screen panels that include a bottom filter panel 9 advantageously of circular shape and a plurality of side filter panels 8.

Figure 3:
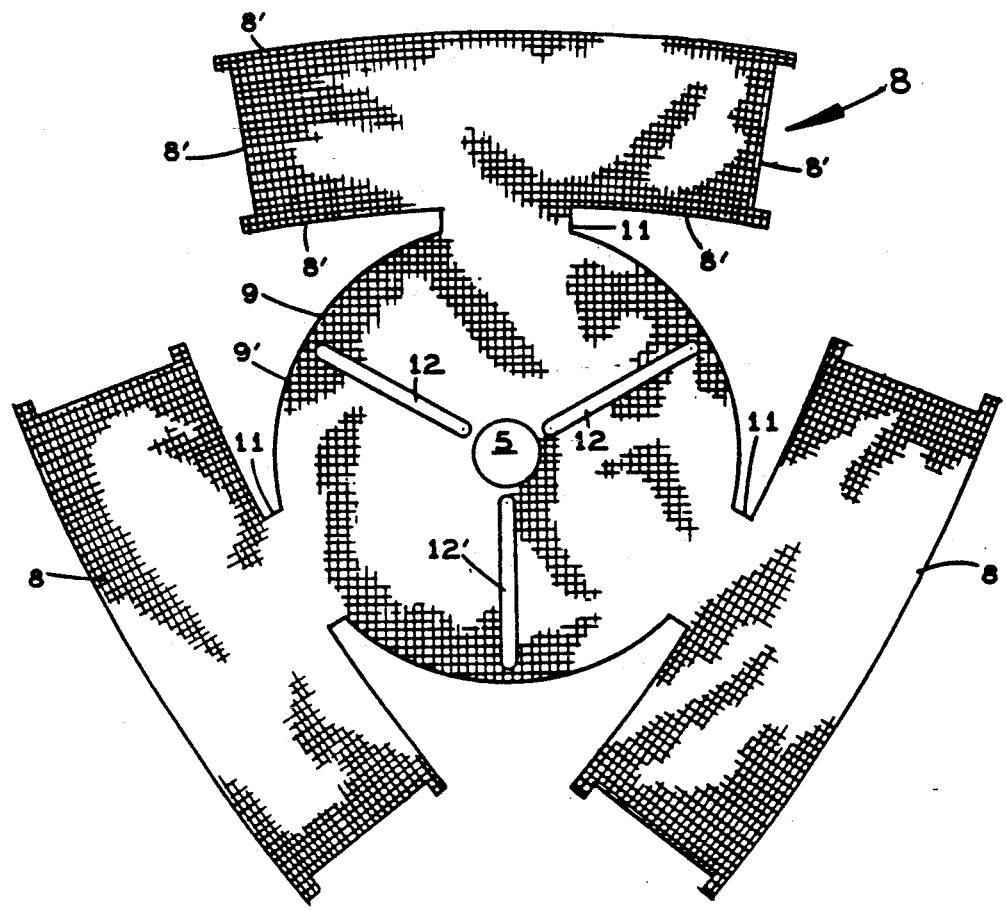
FIG. 3 is a plan view showing the filter mesh in unfolded condition.

According to one feature of the invention the entire screen is die cut or stamped as a single piece of screen material shown in FIG. 3, which shows the bottom panel 9 and a plurality of e.g. three side panels 8. Each of the side panels 8 are attached at a short peripheral section 11 to the circular bottom section so that the entire screen forms a single unitary piece of screen mesh, which, when the side panels 8 are folded up form a basket with elongate spaces or slots 10 (FIG. 4) formed by the edges 8' of the side panels 8 and 9' of the bottom panel 9. The bottom panel 9 has a plurality of e.g. 3 radial slots 12 also forming edges 12'. The end edges 8' of the side panels 8 form slots 15.

Figure 4:
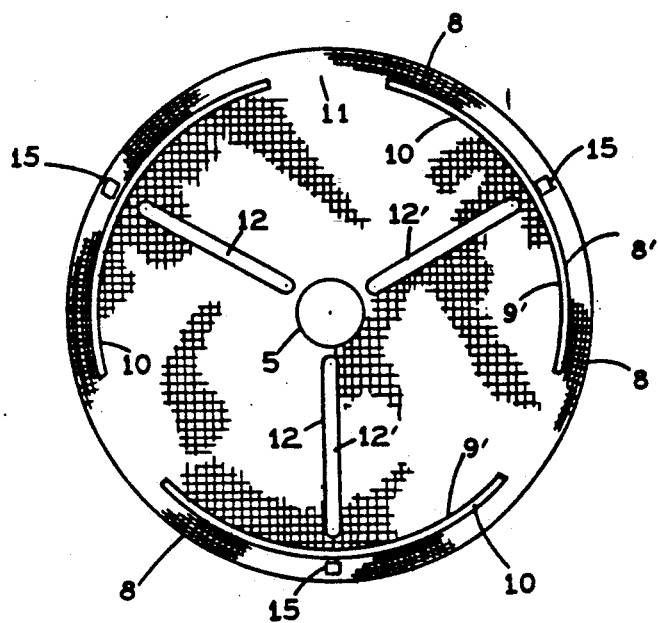
FIG. 4 is a detail view showing the folded filter mesh.

FIG. 4 is a top down view of the basket of filter mesh after the side panels 8 have been folded up, and the basket is now ready to be inserted into a female part of an injection mold, which has a corresponding male part of the mold. The mold parts have mold cavities aligned with the slots 10, 12, 15, which respectively form the lower circular molded frame member 3, the radial frame members 7, the space members 4, and has an additional cavity forming the upper circular frame member 2, and a cavity forming the center button 6. All the mold cavities are arranged such that they overlap the edges of the filter panels, so that when the molded frame member is finished, it embeds the panel edges in the molded members, as seen e.g. in FIG. 2, wherein the edges of the slots 12 fall within the outer boundaries of the radial members 7.

In this manner all filter panels have their respective edges firmly secured within the molded material forming the molded frame members.

This arrangement, according to the invention, makes it possible to form the filter in few manufacturing steps, namely stamping out the unitary filter panel assembly seen in FIG. 3, forming the filter panel assembly into a "basket" as shown in FIG. 4, and inserting the basket in the mold, closing the mold and injecting the molding material. After opening the mold, the entire completed filter assembly is removed from the mold.

The mechanical details of the mold are not shown in the drawing or described in greater detail since the invention is not directed to the construction of the mold, except for the arrangement of the cavities forming the molded frame members, which are described above.

Figure 5:
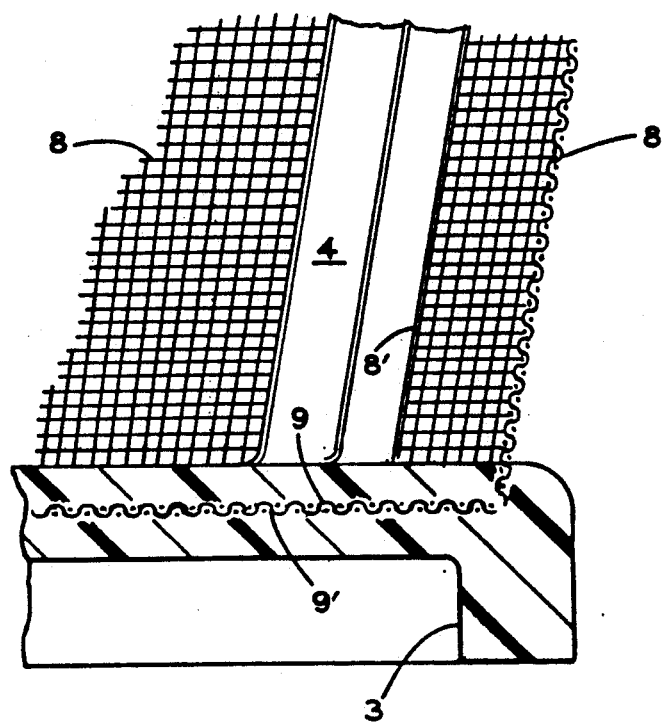
FIG. 5 is an elevational cross-sectional fragmentary enlarged detail showing a molded bottom edge of the filter with the screen edges molded into the lower circular molded frame member.

FIG. 5 shows a fragmentary detail of the bottom circular member 3 with an edge 9' of the bottom panel 9 and a lower edge 8' of a side panel 8 embedded in the lower circular frame member 3.

Figure 6:
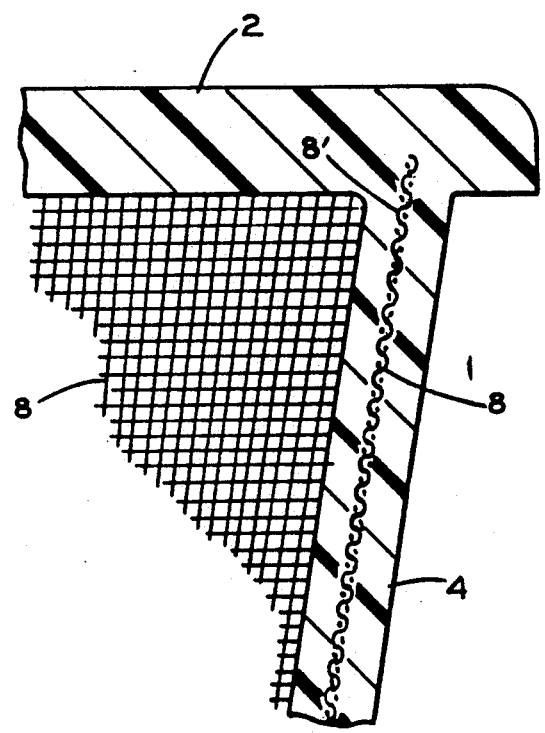
FIG. 6 is a cross-sectional fragmentary enlarged detail view showing an upper edge of the upper circular molded frame member.

FIG. 6 shows a fragmentary detail of the upper circular frame member 2 with an edge 8' of one of the side panels 8 embedded therein. An upper end of a space frame member 4 is seen connected to the upper circular frame member 2.

I claim:

1. A filter for separating a fluid and particles immixed in the fluid, comprising a screen composed of a plurality of screen panels, said screen panels being made from a single piece of wire mesh, and wherein said screen panels are connected with each other by peripheral sections of said wire mesh, each screen panel defined by respective panel edges, and a molded filter frame including a plurality of molded frame members, wherein said panel edges are molded into said molded frame members.

2. A filter according to claim 1, including in said plurality of screen panels a bottom screen panel having a bottom periphery, and a plurality of side panels, each of said side panels having a bottom edge having an edge section being contiguous with said bottom panel along a part of said bottom periphery.

3. A filter according to claim 2, wherein said bottom screen panel has a center opening and a plurality of radial slots in said bottom screen panel, each radial slot radially extending from a point proximal to said center opening to a point proximal to said bottom periphery, said radial slots having edges molded into respective ones of said molded frame members.

4. A filter according to claim 1, including in said molded frame members an upper circular frame member, a lower circular frame member spaced downward from said upper circular frame member, wherein said upper circular frame member has a diameter greater than the diameter of said lower frame member.

5. A filter according to claim 4, including a plurality of molded space members in said plurality of molded frame members, said space members connected between said upper and lower circular frame member.

6. A filter according to claim 5, wherein said lower circular frame member has a center, and a plurality of radial members in said plurality of molded frame members extending from said center to said lower circular frame member.

7. A filter according to claim 6, including a center button disposed in said center, said center button joining said radial members at their inner ends.

8. A filter according to claim 1, wherein said screen is made from a woven mesh of wires.

9. A filter according to claim 8, wherein said woven mesh of wires includes wires of stainless steel.

10. A filter according to claim 8 wherein said woven mesh of wires includes wires of bronze.

* * * * *